US010701335B2

United States Patent
Wu et al.

(10) Patent No.: US 10,701,335 B2
(45) Date of Patent: Jun. 30, 2020

(54) CALCULATION OF TEMPORALLY COHERENT DISPARITY FROM SEQUENCE OF VIDEO FRAMES

(71) Applicant: INTEL CORPORATION, Santa Clara, CA (US)

(72) Inventors: Yi Wu, San Jose, CA (US); Yong Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/072,231

(22) PCT Filed: Feb. 25, 2016

(86) PCT No.: PCT/CN2016/074584
§ 371 (c)(1),
(2) Date: Jul. 24, 2018

(87) PCT Pub. No.: WO2017/143572
PCT Pub. Date: Aug. 31, 2017

(65) Prior Publication Data
US 2019/0098281 A1 Mar. 28, 2019

(51) Int. Cl.
*H04N 13/00* (2018.01)
*H04N 5/232* (2006.01)
(Continued)

(52) U.S. Cl.
CPC ......... *H04N 13/128* (2018.05); *G06K 9/6215* (2013.01); *G06T 7/248* (2017.01);
(Continued)

(58) Field of Classification Search
CPC .............................. H04N 13/15; G06T 7/593
See application file for complete search history.

(56) References Cited

U.S. PATENT DOCUMENTS

| | | | |
|---|---|---|---|
| 6,847,728 B2* | 1/2005 | Tao | G06T 7/579 382/106 |
| 8,515,172 B2* | 8/2013 | Varekamp | G06T 7/136 382/173 |

(Continued)

FOREIGN PATENT DOCUMENTS

| | | |
|---|---|---|
| CN | 1885953 | 12/2006 |
| EP | 1175104 | 4/2002 |

(Continued)

OTHER PUBLICATIONS

Fast temporal filtering of depth maps; Mityunin; 2011. (Year: 2011).*

(Continued)

*Primary Examiner* — Luis Perez-Fuentes
(74) *Attorney, Agent, or Firm* — Finch & Maloney PLLC (57) ABSTRACT

Techniques are provided for calculating temporally coherent disparity values for pixels in a sequence of image frames. An example method may include calculating initial spatial disparity costs between a pixel of a first image frame from a reference camera and pixels from an image frame from a secondary camera. The method may also include estimating a motion vector for the pixel of the first reference camera image frame to a corresponding pixel from a second reference camera image frame. The method may further include calculating a confidence value for the estimated motion vector based on a measure of similarity between the colors of the pixels of the first and second image frames from the reference camera. The method may further include calculating temporally coherent disparity costs based on the initial spatial disparity costs weighted by the confidence value and selecting a disparity value based on those costs.

23 Claims, 8 Drawing Sheets

(51) Int. Cl.
  *H04N 13/128*   (2018.01)
  *H04N 13/144*   (2018.01)
  *G06T 7/73*     (2017.01)
  *G06T 7/90*     (2017.01)
  *G06T 7/246*    (2017.01)
  *G06T 7/593*    (2017.01)
  *H04N 13/239*   (2018.01)
  *G06K 9/62*     (2006.01)
  *G06T 7/223*    (2017.01)

(52) U.S. Cl.
  CPC ............. *G06T 7/593* (2017.01); *G06T 7/74* (2017.01); *G06T 7/90* (2017.01); *H04N 13/144* (2018.05); *H04N 13/239* (2018.05); *G06T 7/223* (2017.01); *G06T 2207/10016* (2013.01); *G06T 2207/10024* (2013.01); *H04N 2013/0081* (2013.01); *H04N 2013/0085* (2013.01)

(56) References Cited

U.S. PATENT DOCUMENTS

| | | | |
|---|---|---|---|
| 8,995,755 B2* | 3/2015 | Lu | G06K 9/00 382/154 |
| 9,118,902 B1* | 8/2015 | Conran | H04N 13/261 |
| 9,571,819 B1* | 2/2017 | Barron | H04N 13/128 |
| 2004/0109585 A1* | 6/2004 | Tao | G06T 7/579 382/106 |
| 2012/0008857 A1* | 1/2012 | Choi | G06T 7/593 382/154 |
| 2013/0120528 A1 | 5/2013 | Schlosser et al. | |
| 2014/0003711 A1* | 1/2014 | Ngan | G06T 7/11 382/164 |
| 2016/0198138 A1* | 7/2016 | Wu | H04N 5/247 348/47 |
| 2019/0098281 A1* | 3/2019 | Wu | H04N 13/144 |

FOREIGN PATENT DOCUMENTS

| | | |
|---|---|---|
| EP | 2466902 | 6/2012 |
| WO | 2014135400 | 9/2014 |

OTHER PUBLICATIONS

Joint disparity and optical flow by correspondence growing; Cech; 2011. (Year: 2011).*
A taxonomy and evaluation of dense two-frame stereo correspondence algorithms; Scharstein; 2006 (Year: 2006).*
NPL Google Search; 2020. (Year: 2020).*
Real-Time Photometric Registration from Arbitrary Geometry; Gruber; 2012. (Year: 2012).*
Temporally consistent disparity maps for uncalibrated stereo videos; Bleyer; 2009. (Year: 2009).*
Segmentation in multi-view video via color, depth and motion cues; Cigla; et al. 2008. (Year: 2008).*
Taxonomy and evaluation of dense two-frame stereo correspondence algorithms; Scharstein; 2006 (Year: 2006).*
International Search Report for International Patent Application No. PCT/CN2016/074584, dated Nov. 16, 2016, 4 pages.
International Written Opinion of the International Searching Authority for International Patent Application No. PCT/CN2016/074584, dated Nov. 16, 2016, 4 pages.
International Publication for International Patent Application No. PCT/CN2016/074584, WO2017/143572, published Aug. 31, 2017, 37 pages.
Matyunin, S. et al., "Fast Temporal Filtering of Depth Maps", WSCG 2011 Poster Papers, 2011, 4 pages.
Bleyer, M. and M. Gelautz, "Temporally Consistent Disparity Maps from Uncalibrated Stereo Videos", Proceedings of the 6th International Symposium on Image and Signal Processing and Analysis, 2009, 5 pages.
Gong, Minglun, "Real-time Joint Disparity and Disparity Flow Estimation on Programmable Graphics Hardware", Computer Vision and Image Understanding, 2009, pp. 90-100.
Chec, Jan and Radu Horaud, "Joint Disparity and Optical Flowby Correspondence Growing", IEEE International Conference on Acoustics, Speech, and Signal Processing, 2011, pp. 893-896.
Richardt, C. et al., "Real-time Spatiotemporal Stereo Matching Using the Dual-Cross-Bilateral Grid", European Conference on Computer Vision (ECCV), 2010, 14 pages.
International Preliminary Report on Patentability from the International Bureau dated Sep. 7, 2018 for the International Patent Application No. PCT/CN2016/074584, 5 pages.

* cited by examiner

CALCULATION OF TEMPORALLY COHERENT DISPARITY FROM SEQUENCE OF VIDEO FRAMES

BACKGROUND

Three dimensional (3D) video applications are becoming increasingly common as they may provide a more compelling visual experience to the viewer. One method of generating 3D video makes use of multiple cameras to derive depth information based on the disparity resulting from a perspective offset between the cameras, in a manner similar to human binocular vision. Conventional techniques typically estimate this disparity based on an analysis of corresponding still image video frames from each camera. This per-frame approach, however, often results in unpleasant artifacts such as flickering between consecutive frames. Some techniques have been developed to improve disparity estimation but they generally impose large computational burdens or excessive memory requirements, or they rely on limiting assumptions about the video characteristics.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for calculating temporally coherent disparity for a sequence of video image frames received from two or more cameras. The resulting improved disparity estimation may be used, for example, to generate image depth and enable 3D applications to produce images with reduced flicker for an improved viewing experience. In accordance with an embodiment, an initial spatial disparity estimation is based on a comparison of corresponding image frames from two or more cameras at a given capture time. The initial spatial disparity estimation is then improved with a temporal coherence component that is based on motion estimation between successive image frames from the cameras. Additionally, a confidence based weighting function is applied to the motion estimation, based on the assumption that corresponding pixels based on motion prediction should maintain relatively similar color characteristics between successive frames, as will be explained in greater detail below.

The techniques described herein for temporally coherent disparity calculation provide generally improved results over conventional techniques that rely solely on spatial disparity estimates based on each still image frame pair, according to some embodiments. Additionally, by separating the motion vector calculation from the disparity calculation, the techniques described herein may be more computationally efficient and consume less memory than other existing methods. As will be appreciated in light of this disclosure, the temporally coherent disparity calculation techniques provided herein can be implemented in hardware or software or a combination thereof, and may be adapted into any number of applications where disparity estimation is desired.

Figure 1:
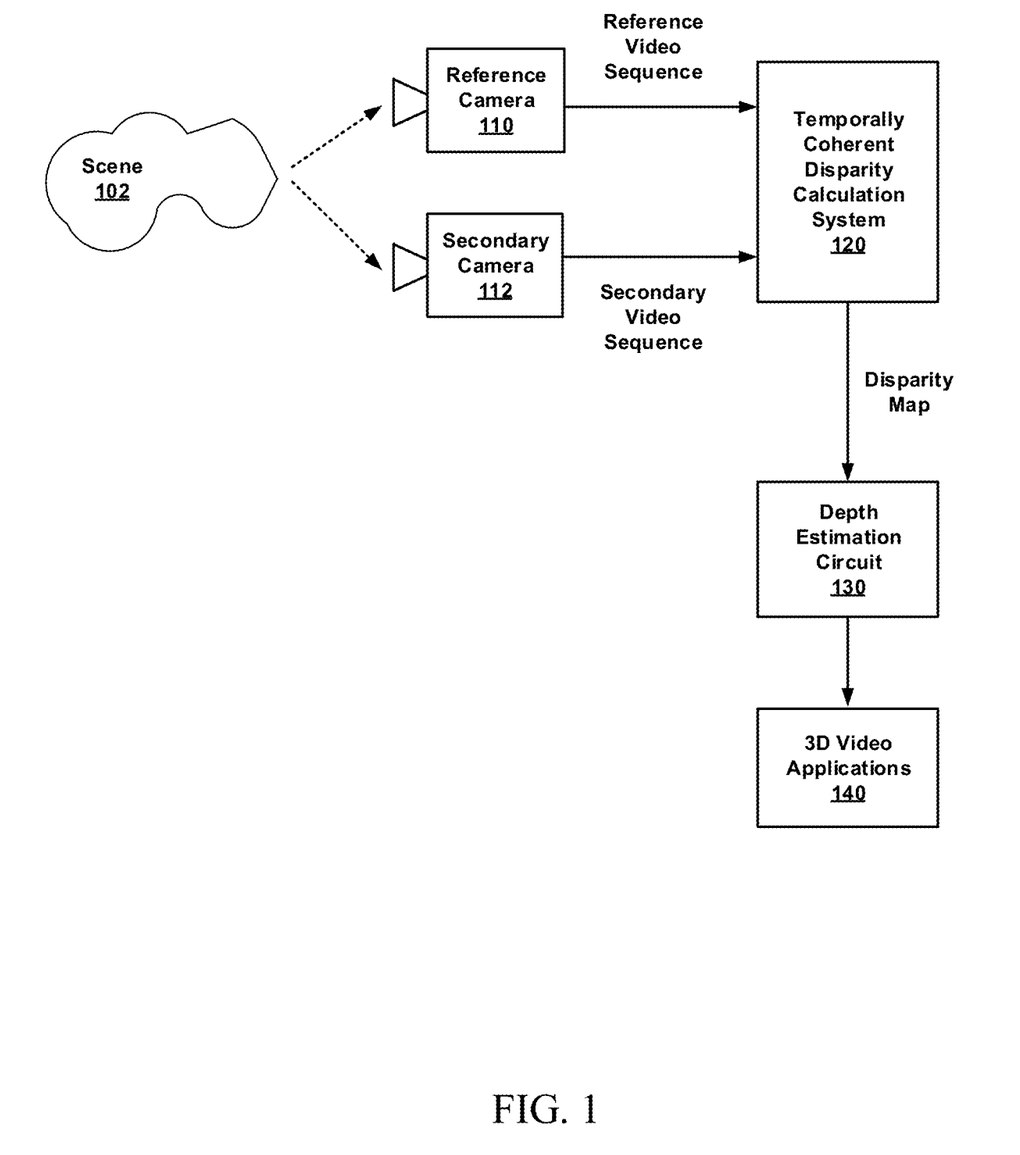
FIG. 1 is a top level block diagram of an application of a system for temporally coherent disparity calculation, in accordance with certain of the embodiments disclosed herein.

FIG. 1 is a top level block diagram 100 of an application of a system for temporally coherent disparity calculation, in accordance with certain of the embodiments disclosed herein. Two or more video cameras, in this example a reference camera 110 and a secondary camera 112, are configured to capture video streams of a scene 102. The scene 102 may include any number of background and/or foreground objects at varying distances from the camera. The video streams generally comprise a sequence of still image frames captured at a suitable frame rate. In some embodiments the frame rate may be 30 frames per second or more. Each frame includes a number of pixels, which may be represented by grayscale or color (e.g., red-green-blue or RGB) values. The cameras 110, 112 are offset from one another, to at least some degree, to provide different perspectives of the scene. This perspective difference results in a spatial offset or disparity between pixels in the reference camera image frame and the corresponding pixels in the secondary camera image frame. The disparity will be largest for pixels that represent objects in the scene that are closest to the camera and will decrease for pixels that represent objects in the scene that are more distant from the camera. Disparity may thus be used to estimate the depth of objects in the scene and to provide 3D imaging effects.

Temporally coherent disparity calculation system 120 may be configured to estimate this disparity between corresponding pixels of the reference camera image frames and the secondary camera image frames. The estimate may be based on both spatial information and temporal information, as will be described in greater detail below. The spatial information may be derived from the reference and secondary camera image frames captured at substantially the same instant in time. The temporal information may be derived from image frames captured from one of the cameras (e.g., the reference camera) at successive points in time.

Depth estimation circuit 130 may be configured to estimate depth based on the disparity. In some embodiments, depth estimation circuit may generate a depth map for each image frame that provides depth values associated with each pixel of the image frame. Various 3D video applications 140 may be configured to provide 3D images or perform 3D calculations or visual manipulations on the scene 102, based on the depth information provided by circuit 130. Although only two cameras 110, 112 are shown in this example, it will be appreciated that the techniques disclosed herein may be extended to embodiments that may include any number of cameras.

Figure 2:
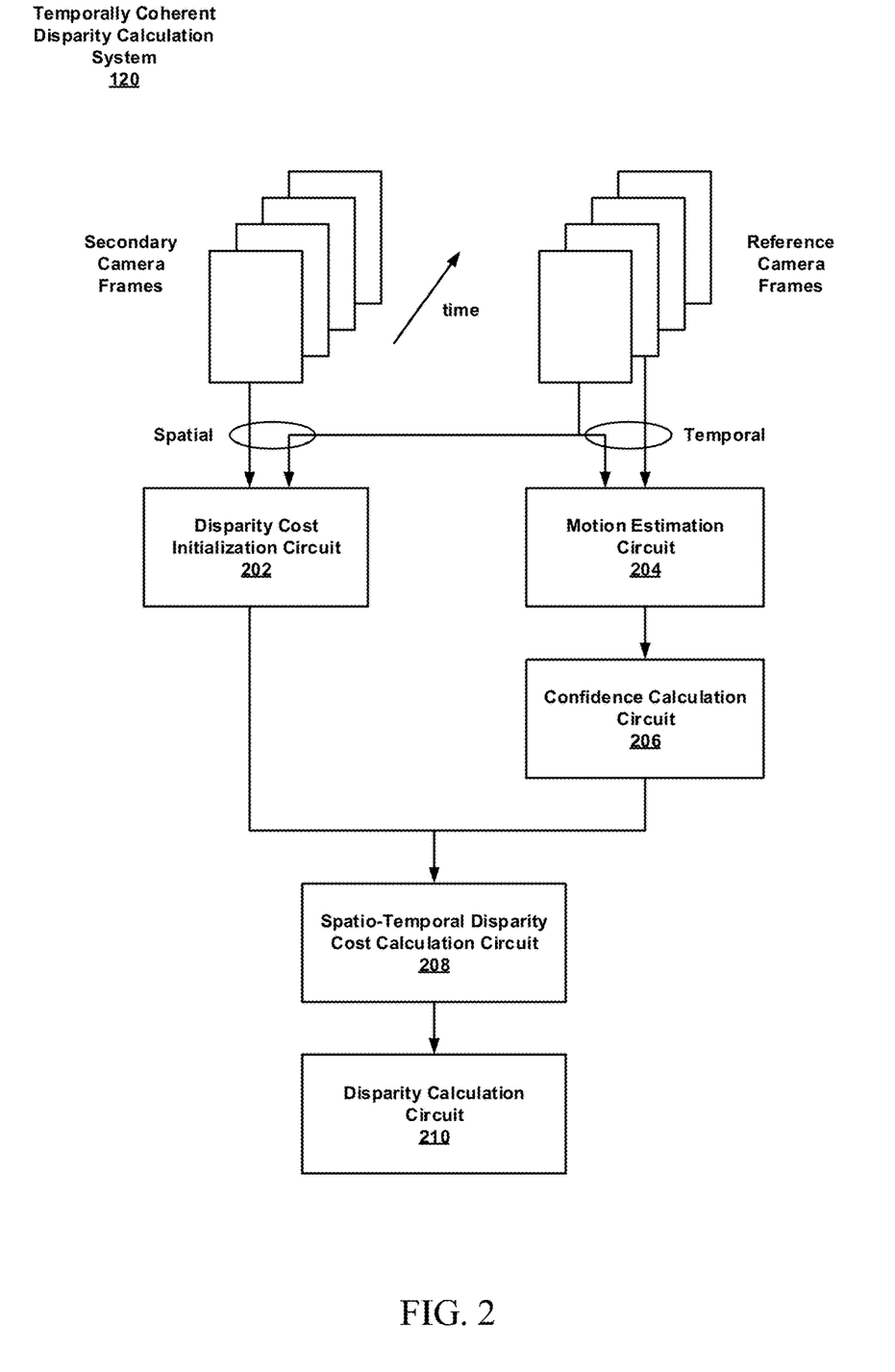
FIG. 2 is a more detailed block diagram of a temporally coherent disparity calculation system, configured in accordance with certain of the embodiments disclosed herein.

FIG. 2 is a more detailed block diagram of a temporally coherent disparity calculation system 120, configured in accordance with certain of the embodiments disclosed herein. The disparity calculation system 120 is shown to include a disparity cost initialization circuit 202, a motion estimation circuit 204, a confidence calculation circuit 206, a spatio-temporal disparity cost calculation circuit 208 and a disparity calculation circuit 210.

Figure 3:
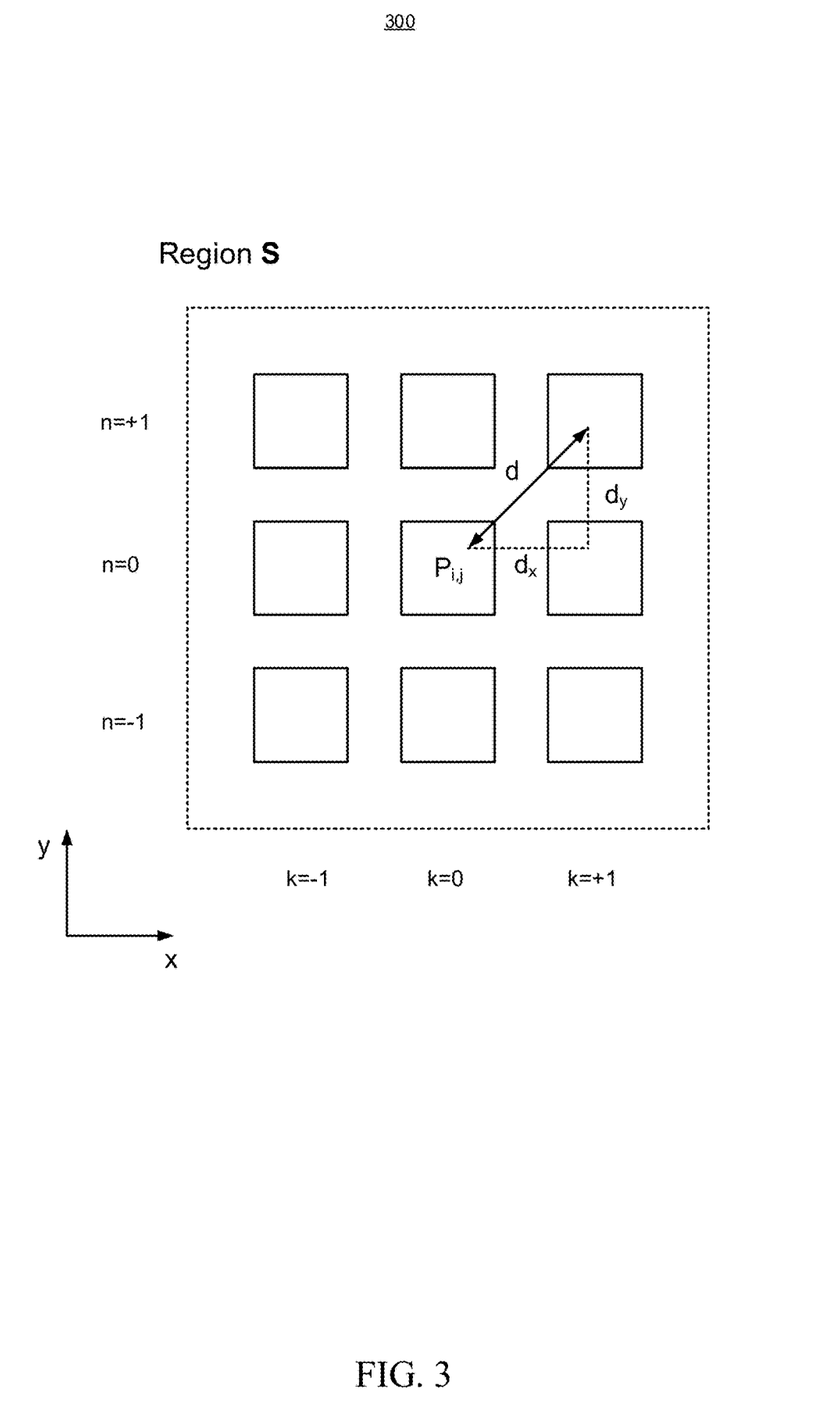
FIG. 3 illustrates spatial disparity cost calculations, in accordance with certain of the embodiments disclosed herein.

The disparity cost initialization circuit 202 may be configured to receive an image frame from the reference camera and a corresponding image frame from the secondary camera, both image frames capturing the scene at substantially the same time. For each pixel of the reference camera image, circuit 202 calculates initial spatial disparity costs for a range of candidate disparities d between that pixel ($p_{i,j}$) and a number of corresponding pixels from a region S of the secondary camera image. The disparity value associated with the lowest cost is likely to be the most accurate one. In some embodiments, this cost calculation may be expressed as:

$$\text{cost}(p_{i,j}, d) = \sum_{(k,n) \in S} |F_{ref}(i+k, j+n) - F_{sec}(i+k+d_x, j+n+d_y)| \quad \text{equ(1)}$$

where $F_{ref}$ is a feature value of the pixel from the reference camera image, $F_{sec}$ is a feature value of the pixel from the secondary camera image, and $d_x$ and $d_y$ are the x and y components of the candidate disparity d. Feature values may be RGB values, grayscale values, census values, etc. associated with pixels. The cost for each candidate disparity is calculated as a sum of absolute differences of $F_{ref}$ and $F_{sec}$ corresponding to the pixels at locations in the region S. An example is illustrated in FIG. 3, which shows a 3×3 pixel region S around pixel $p_{i,j}$, in the x,y plane, with a candidate value d. Index variables n and k, for the summation, run from −1 to +1 in this 3×3 example. Of course region S may, in general, be any suitable size and the index variable range will be adjusted accordingly.

The motion estimation circuit 204 may be configured to receive a first and second image frame from the reference camera, each frame capturing the scene at successive moments in time, for example at times t−1 and t. Although the following description will focus on the processing of two image frames from the reference camera, for simplicity, it will be understood that the principles may readily be extended to additional frames. Circuit 204 may further be configured to generate a motion map M comprising estimated motion vectors $M_{i,j}$ that describe the motion of pixel $p_{i,j}$ from frame t−1 to frame t of the reference camera. In some embodiments, motion estimation circuit 204 may use dense motion estimation techniques such as Block Matching or Optical Flow Processing, or any other known techniques in light of the present disclosure.

Figure 4:
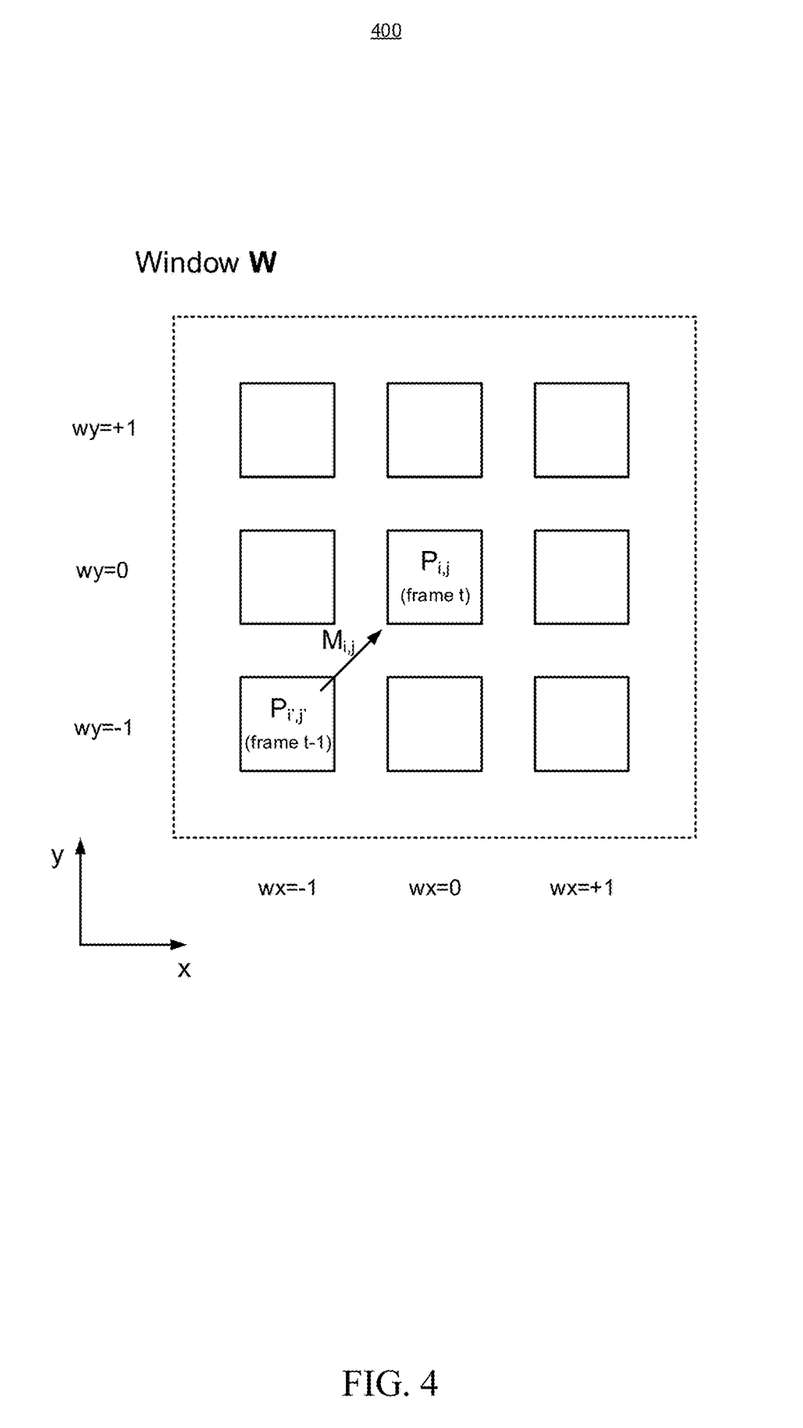
FIG. 4 illustrates temporal disparity cost calculations, in accordance with certain of the embodiments disclosed herein.

Any motion estimation technique will be subject to some degree of error due to image noise, intensity variation, motion occlusion and other factors. For at least this reason, the confidence calculation circuit 206 may be configured to calculate a confidence value $C_{i,j}$ associated with each estimated motion vector $M_{i,j}$. The confidence value is based on a measure of similarity between the color of pixel $p_{i',j'}$ in frame t−1 and the corresponding pixel $p_{i,j}$ in frame t related by the motion vector $M_{i,j}$. This may be computed using a sum of absolute differences of the RGB values of pixels in a neighborhood or window around the pixel in each frame. In some embodiments, this cost calculation may be expressed as:

$$C_{i,j} = \exp\left(-\sum_{(w_x, w_y) \in W} \frac{(R + G + B)}{2 w_x w_y \sigma_c}\right) \quad \text{equ(2)}$$

where $R = |R_t(i+w_x, j+w_y) - R_{t-1}(i'+w_x, j'+w_y)|,$ $G = |G_t(i+w_x, j+w_y) + G_{t-1}(i'+w_x, j'+w_y)|,$ $B = |B_t(i+w_x, j+w_y) + B_{t-1}(i'+w_x, j'+w_y)|,$ In this equation R, G and B are the absolute differences of the red green and blue values, respectively, of the pixel $p_{i',j'}$ in frame t−1 and the corresponding pixel $p_{i,j}$ in frame t, for each offset $w_x$, and $w_y$ ranging over the window W around pixel $p_{i,j}$ that will be used for the confidence calculation. An example is illustrated in FIG. 4, which shows a 3×3 pixel window W around pixel $p_{i,j}$, in the x,y plane. Index variables $w_x$ and $w_y$, for the summation, run from −1 to +1 in this 3×3 example. Of course window W may, in general, be any suitable size and the index variable range will be adjusted accordingly. The exponentiation function transforms the sum of absolute differences into a confidence level where larger differences in color correspond to lower confidence values while smaller differences correspond to higher confidence values. The $\sigma_c$ term is an empirical parameter that may be chosen or adjusted to weight the penalty that is applied to the confidence value as a function of the magnitude of the color differences.

The spatio-temporal disparity cost calculation circuit 208 may be configured to compute an updated cost for each of the initial candidate disparities (e.g., the cost($p_{i,j}$,d) as generated by circuit 202 described above). This updated cost, which is both spatially and temporally coherent, incorporates the motion estimation and associated confidence values in a manner that penalizes disparity discrepancies between corresponding pixels in two consecutive frames. In some embodiments, this updated cost calculation for frame t may be expressed as:

$$\text{cost}_t(p_{i,j}, d) = \frac{\text{cost}(p_{i,j}, d)}{\exp(-|d_{t-1}(p_{i',j'}) - d|/(c_{i,j} * \sigma))} \quad \text{equ(3)}$$

where d represents each candidate disparity for the pixel $p_{i,j}$ of frame t, and $d_{t-1}(p_{i',j'})$ represents the disparity of corresponding pixel $p_{i',j'}$ of frame t−1 (based on motion vector $M_{i,j}$). Additionally, $c_{i,j}$ is the confidence value calculated by circuit 206 and the σ term is another empirical parameter that may be chosen or adjusted to degree of influence that motion estimation should have on the temporal cost calculation.

The disparity calculation circuit 210 may be configured to select an "optimal" disparity from the set of candidate disparities based on the calculated temporally coherent disparity costs associated with each candidate disparity. In some embodiments, the selection may employ a "winner takes all approach" where the candidate disparity with the lowest cost is chosen as optimal. In some embodiments, an optimal disparity may be calculated using other techniques such as Graph Cut, Belief Propagation or any other known techniques in light of the present disclosure.

Figure 5:
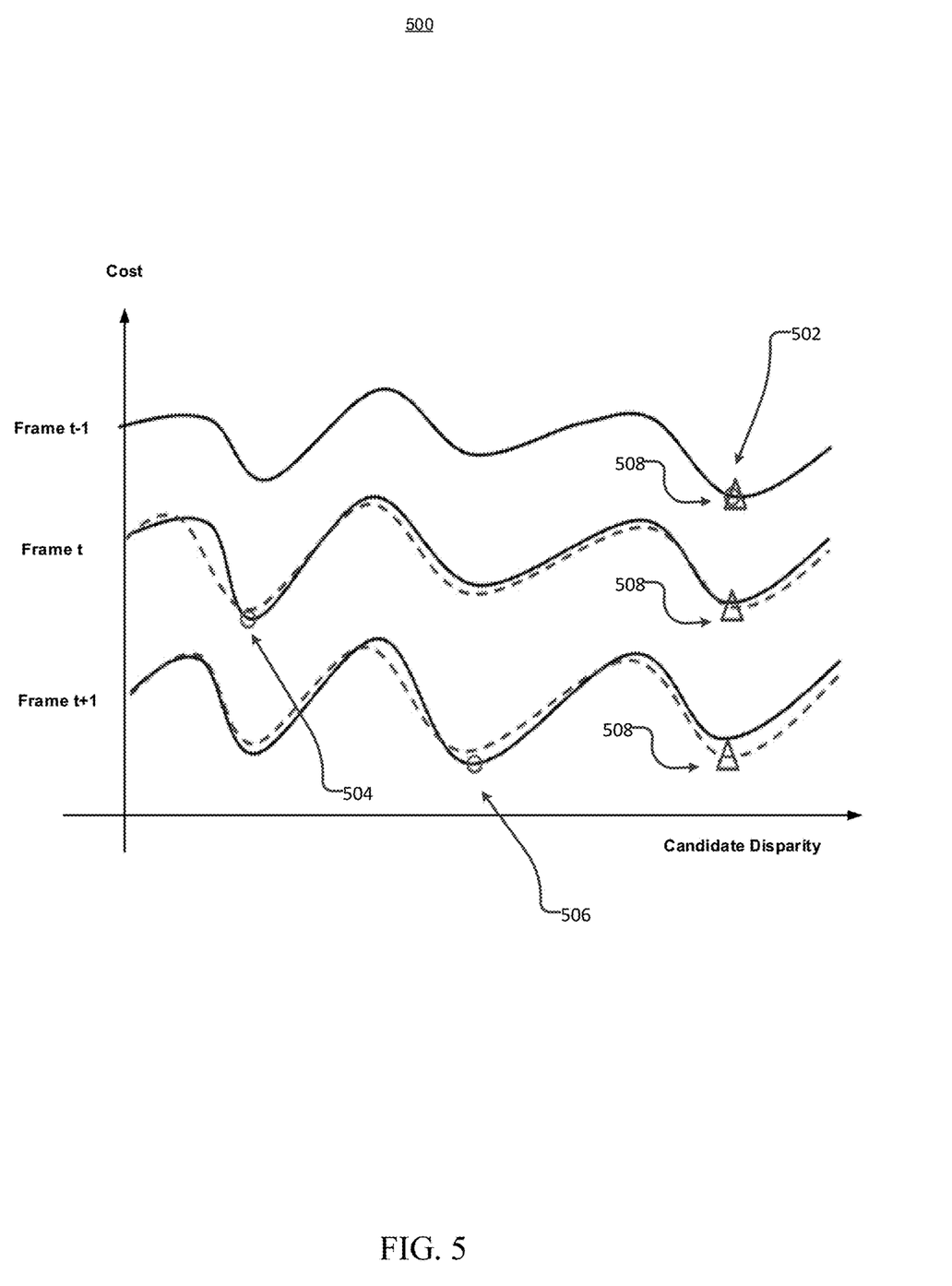
FIG. 5 illustrates selection of disparity based on temporal disparity cost, in accordance with certain of the embodiments disclosed herein.

FIG. 5 illustrates an example 500 of the selection of disparity based on temporal disparity cost, in accordance with certain of the embodiments disclosed herein. Plots are shown illustrating disparity cost versus candidate disparity value, for a given pixel, for each of three consecutive frames at times t−1, t and t+1. The solid line plots represent the per-frame or spatial cost function (e.g., from equation (1) above) while the dashed line plots represent the spatio-temporal coherent cost function (e.g., from equation (3) above). A comparison of solid and dashed lines illustrates how the cost function is impacted by temporal coherence. The circle markers 502, 504 and 506 indicate the chosen candidate disparity value corresponding to the lowest cost value in the solid line (per-frame) cost curve. It can be seen that the disparity values can vary greatly from frame to frame (which can cause unpleasant flickering effects in subsequent or downstream 3D video production). With the incorporation of temporal coherence to the cost function, however, it can be seen that the chosen disparity values, corresponding to the lowest cost value in the dashed line cost curve indicated by the triangle markers 508, remain relatively consistent from frame to frame.

Figure 6:
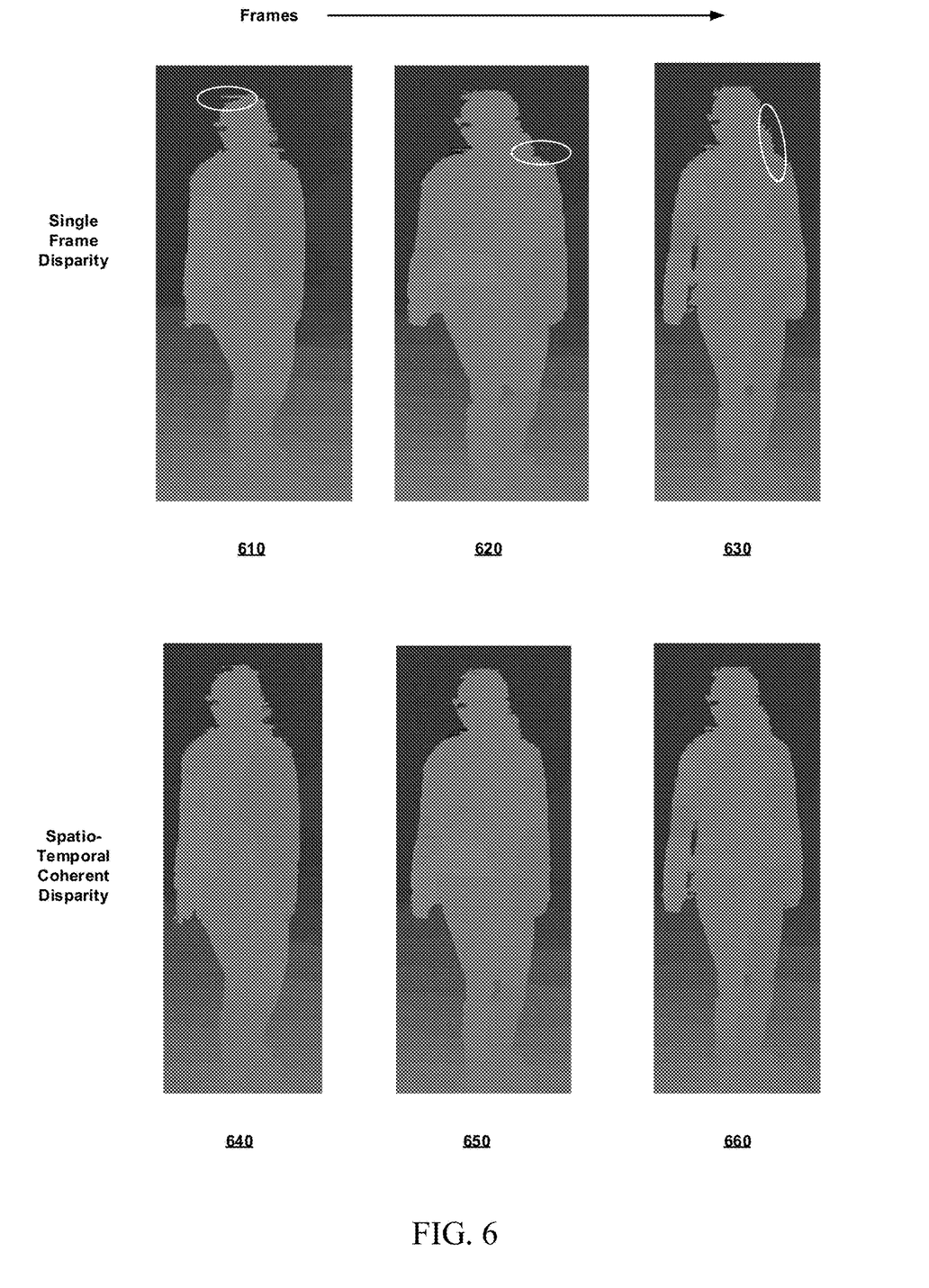
FIG. 6 illustrates a comparison of single frame disparity versus spatio-temporal coherent disparity, in accordance with certain of the embodiments disclosed herein.

FIG. 6 illustrates a comparison of single frame disparity versus spatio-temporal coherent disparity, in accordance with certain of the embodiments disclosed herein. Disparity maps, which illustrate the disparity values for the pixels in each frame, are shown for a sequence of frames. Disparity maps 610, 620 and 630 show the results of single frame (or per-frame) disparity calculations and exhibit noise artifacts (in the circled regions) around object boundaries. In contrast, disparity maps 640, 650 and 660, which show the results of spatio-temporal coherent disparity calculations, show that those errors are significantly reduced.

Methodology

Figure 7:
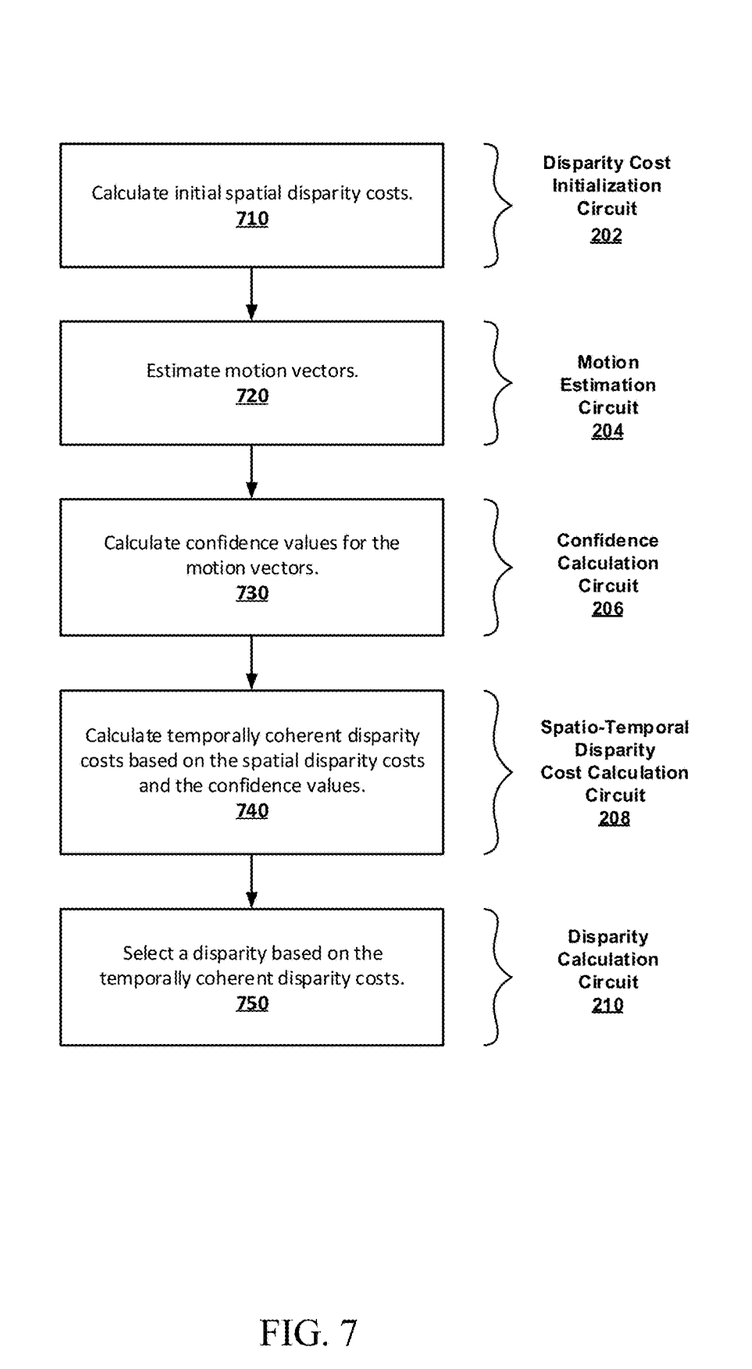
FIG. 7 is a flowchart illustrating a methodology for temporally coherent disparity calculation, in accordance with certain of the embodiments disclosed herein.

FIG. 7 is a flowchart illustrating an example method 700 for temporally coherent disparity calculation of pixels in a sequence of video image frames, in accordance with an embodiment of the present disclosure. As can be seen, example method 700 includes a number of phases and sub-processes, the sequence of which may vary from one embodiment to another. However, when considered in the aggregate, these phases and sub-processes form a process for temporally coherent disparity calculation in accordance with certain of the embodiments disclosed herein. These embodiments can be implemented, for example using the system architecture illustrated in FIG. 2, as described above. However other system architectures can be used in other embodiments, as will be apparent in light of this disclosure. To this end, the correlation of the various functions shown in FIG. 7 to the specific components illustrated in FIG. 2 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 700. Thus other embodiments may have fewer or more modules and/or sub-modules depending on the granularity of implementation. Numerous variations and alternative configurations will be apparent in light of this disclosure.

As illustrated in FIG. 7, in one embodiment, method 700 for temporally coherent disparity calculation commences, at operation 710, by calculating initial spatial disparity costs between a pixel of a first image frame from a reference camera and each of a number of associated pixels from a corresponding region of an image frame from a secondary camera. Next, at operation 720, a motion vector is estimated for the pixel of the first image frame from the reference camera to a corresponding pixel from a second image frame from the reference camera.

At operation 740, a confidence value is calculated for the estimated motion vector. The confidence value is based on a measure of similarity between the color (RGB values) of the pixel of the first image frame and the color of the pixel of the second image frame, from the reference camera. At operation 750, temporally coherent disparity costs are calculated based on the initial spatial disparity costs weighted by the confidence value. At operation 760, a temporally coherent disparity is selected based on the calculated costs. In some embodiments, the disparity with the minimum cost may be selected. In other embodiments, a graph cut algorithm or a belief propagation algorithm may be employed to select the disparity based on the calculated costs.

Of course, in some embodiments, additional operations may be performed, as previously described in connection with the system. These additional operations may include, for example, estimating a depth value for the pixels based on the selected disparity. Further additional operations may include, for example, extending the disparity estimation technique to include data (image frames) from additional cameras beyond the reference camera and the secondary camera.

Example System

Figure 8:
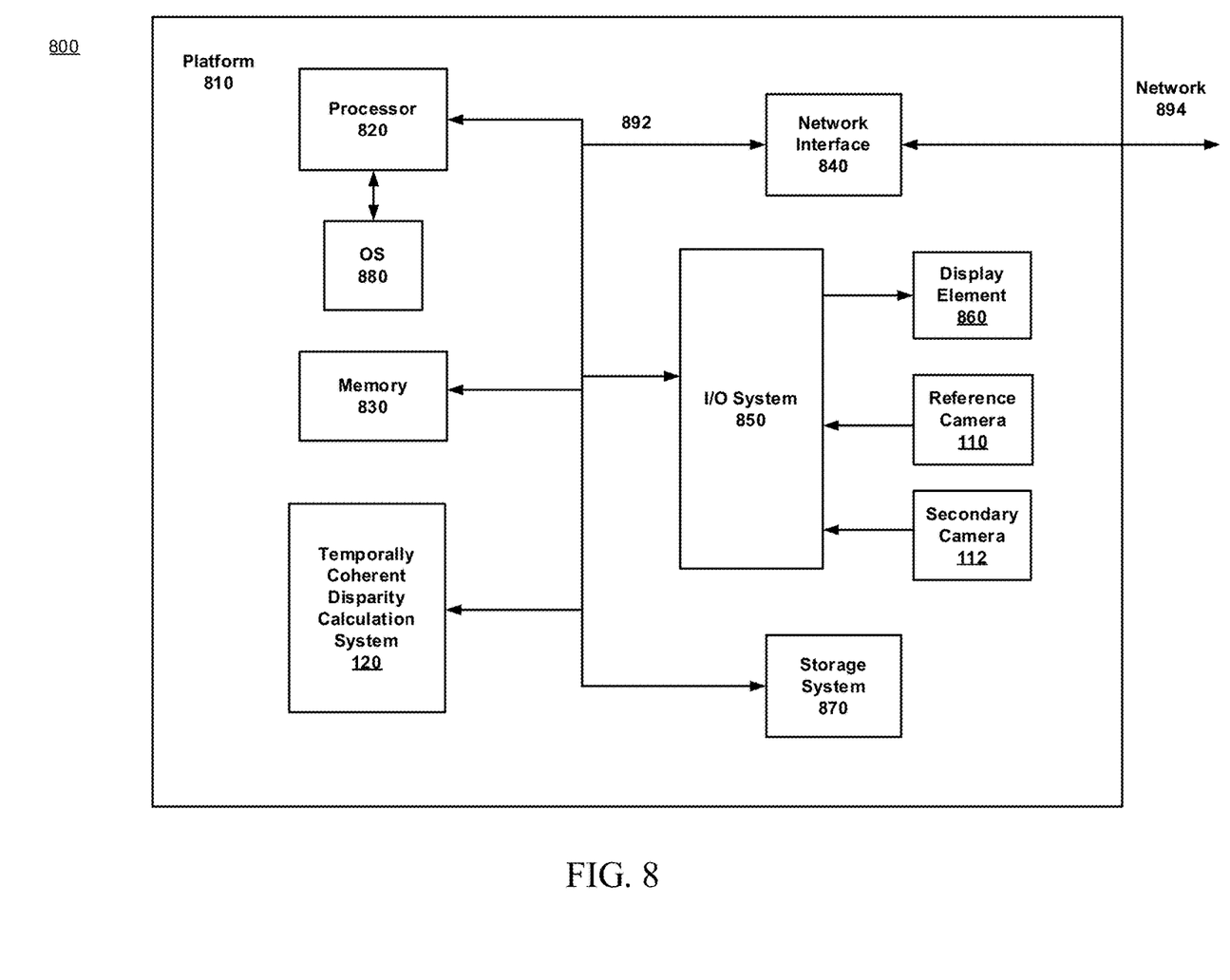
FIG. 8 is a block diagram schematically illustrating a system platform to calculate temporally coherent disparity from a sequence of video frames, configured in accordance with certain of the embodiments disclosed herein.

FIG. 8 illustrates an example system 800 that may be configured to calculate temporally coherent disparity values for pixels in a sequence of video image frames, as described herein. In some embodiments, system 800 comprises a platform 810 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), and so forth. Any combination of different devices may be used in certain embodiments.

In some embodiments, platform 810 may comprise any combination of a processor 820, a memory 830, a temporally coherent disparity calculation system 120, a reference camera 110, a secondary camera 112, a network interface 840, an input/output (I/O) system 850, a display element 860, and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor or a graphics processing unit, to assist in control and processing operations associated with system 800. In some embodiments, the processor 820 may be implemented as any number of processor cores. The processor (or processor cores) may be any type or combination of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Linux, or Apple OS X (Apple Inc., Cupertino, Calif.) and/or various real-time operating systems. As will be appreciated in light of this disclosure, the techniques provided herein can be implemented without regard to the particular operating system provided in conjunction with system 800, and therefore may also be implemented using any suitable existing or subsequently-developed platform.

Network interface module 840 can be any appropriate network chip or chipset which allows for wired and/or wireless connection between other components of computer system 800 and/or network 894, thereby enabling system 800 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, a display element 860, a reference camera 110, a secondary camera 112, and other devices not shown such as a keyboard, mouse, speaker, microphone, etc.

I/O system 850 may include a graphics subsystem configured to perform processing of images for display element 860. Graphics subsystem may be a graphics processing unit or a visual processing unit (VPU), for example. An analog or digital interface may be used to communicatively couple graphics subsystem and display element 860. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 820 or any chipset of platform 810. In some embodiments, display element 860 may comprise any television type monitor or display, including liquid crystal displays (LCDs) and light emitting diode displays (LEDs). Display element 860 may comprise, for example, a computer display screen, touchscreen display, video monitor, television-like device, and/or a television. Display element 860 may be digital and/or analog. Under the control of the OS 880 (or one or more software applications), platform 810 may display processed images on display element 860. The images may be provided by temporally coherent disparity calculation system 120, reference camera 110, secondary camera 112, or other sources. Cameras 110 and 112 may be configured to provide color (RGB) images from which temporally coherent pixel disparities may be generated.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Temporally coherent disparity calculation system 120 is configured to generate temporally coherent disparity values for pixels in a sequence of video image frames from two or more cameras. Temporally coherent disparity calculation system 120 may include any or all of the components illustrated in FIG. 2 and described above. Temporally coherent disparity calculation system 120 can be implemented or otherwise used in conjunction with a variety of suitable software and/or hardware that is coupled to or that otherwise forms a part of system 800. Temporally coherent disparity calculation system 120 can additionally or alternatively be implemented or otherwise used in conjunction with user I/O devices that are capable of providing information to, and receiving information and commands from, a user. These I/O devices may include display element 860, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments temporally coherent disparity calculation system 120 may be installed local to system 800, as shown in the example embodiment of FIG. 8. Alternatively, system 800 can be implemented in a client-server arrangement (or local and cloud based arrangement) wherein at least some functionality associated with temporally coherent disparity calculation system 120 is provided to system 800 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 894 or remotely coupled to network 894 by one or more other networks and/or communication channels. In some cases access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the methodologies for calculating temporally coherent disparity values, disclosed herein, to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, temporally coherent disparity calculation system 120 may operate by leveraging processing resources provided by a remote computer system accessible via network 894. In other embodiments the functionalities disclosed herein can be incorporated into other software applications, such as image management applications. The computer software applications disclosed herein may include any number of different modules, submodules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for calculation of temporally coherent disparity. The method comprises: calculating, by a processor, a plurality of initial spatial disparity costs between a pixel of a first image frame from a reference camera and each of a plurality of corresponding pixels in an image frame from a secondary camera; estimating, by the processor, a motion vector for the pixel of the first image frame from the reference camera to a corresponding pixel from a second image frame from the reference camera; calculating, by the processor, a confidence value associated with the estimated motion vector, the confidence value based on a measure of similarity between the color of the pixel of the first image frame and the color of the pixel of the second image frame, from the reference camera; calculating, by the processor, temporally coherent disparity costs based on the initial spatial disparity costs weighted by the confidence value; and selecting, by the processor, a temporally coherent disparity based on the temporally coherent disparity costs.

Example 2 includes the subject matter of Example 1, further comprising calculating the initial spatial disparity costs based on a sum of absolute differences of one or more features of the pixel of the first image frame from the reference camera and the corresponding pixels from the image frame from the secondary camera.

Example 3 includes the subject matter of Examples 1 and 2, wherein the one or more features include a red-green-blue (RGB) value, a grayscale value or a census value.

Example 4 includes the subject matter of Examples 1-3, further comprising estimating the motion vector based on one of block matching or optical flow processing.

Example 5 includes the subject matter of Examples 1-4, further comprising estimating the motion vector based on locations of the corresponding pixel in additional image frames from the reference camera.

Example 6 includes the subject matter of Examples 1-5, further comprising selecting the temporally coherent disparity corresponding to the minimum temporally coherent disparity cost.

Example 7 includes the subject matter of Examples 1-6, further comprising determining the temporally coherent disparity based on applying one of a graph cut or a belief propagation to the temporally coherent disparity costs.

Example 8 includes the subject matter of Examples 1-7, further comprising estimating pixel depth based on the temporally coherent disparity.

Example 9 is a system for calculation of temporally coherent disparity. The system comprises: a disparity cost initialization circuit to calculate a plurality of initial spatial disparity costs between a pixel of a first image frame from a reference camera and each of a plurality of corresponding pixels in an image frame from a secondary camera; a motion estimation circuit to estimate a motion vector for the pixel of the first image frame from the reference camera to a corresponding pixel from a second image frame from the reference camera; a confidence calculation circuit to calculate a confidence value associated with the estimated motion vector, the confidence value based on a measure of similarity between the color of the pixel of the first image frame and the color of the pixel of the second image frame, from the reference camera; a disparity cost calculation circuit to calculate temporally coherent disparity costs based on the initial spatial disparity costs weighted by the confidence value; and a disparity calculation circuit to select a temporally coherent disparity based on the temporally coherent disparity costs.

Example 10 includes the subject matter of Example 9, wherein the disparity cost initialization circuit is further to calculate the initial spatial disparity costs based on a sum of absolute differences of one or more features of the pixel of the first image frame from the reference camera and the corresponding pixels from the image frame from the secondary camera.

Example 11 includes the subject matter of Examples 9 and 10, wherein the one or more features include a red-green-blue (RGB) value, a grayscale value or a census value.

Example 12 includes the subject matter of Examples 9-11, wherein the motion estimation circuit is further to estimate the motion vector based on one of block matching or optical flow processing.

Example 13 includes the subject matter of Examples 9-12, wherein the motion estimation circuit is further to estimate the motion vector based on locations of the corresponding pixel in additional image frames from the reference camera.

Example 14 includes the subject matter of Examples 9-13, wherein the disparity calculation circuit is further to select the temporally coherent disparity corresponding to the minimum temporally coherent disparity cost.

Example 15 includes the subject matter of Examples 9-14, wherein the disparity calculation circuit is further to determine the temporally coherent disparity based on applying one of a graph cut or a belief propagation to the temporally coherent disparity costs.

Example 16 includes the subject matter of Examples 9-15, further comprising a depth estimation circuit to estimate pixel depth based on the temporally coherent disparity.

Example 17 is at least one non-transitory computer readable storage medium having instructions encoded thereon that, when executed by one or more processors, result in the following operations for calculation of temporally coherent disparity. The operations comprise: calculating a plurality of initial spatial disparity costs between a pixel of a first image frame from a reference camera and each of a plurality of corresponding pixels in an image frame from a secondary camera; estimating a motion vector for the pixel of the first image frame from the reference camera to a corresponding pixel from a second image frame from the reference camera; calculating a confidence value associated with the estimated motion vector, the confidence value based on a measure of similarity between the color of the pixel of the first image frame and the color of the pixel of the second image frame, from the reference camera; calculating temporally coherent disparity costs based on the initial spatial disparity costs weighted by the confidence value; and selecting a temporally coherent disparity based on the temporally coherent disparity costs.

Example 18 includes the subject matter of Example 17, further comprising calculating the initial spatial disparity costs based on a sum of absolute differences of one or more features of the pixel of the first image frame from the reference camera and the corresponding pixels from the image frame from the secondary camera.

Example 19 includes the subject matter of Examples 17 and 18, wherein the one or more features include a red-green-blue (RGB) value, a grayscale value or a census value.

Example 20 includes the subject matter of Examples 17-19, further comprising estimating the motion vector based on one of block matching or optical flow processing.

Example 21 includes the subject matter of Examples 17-20, further comprising estimating the motion vector based on locations of the corresponding pixel in additional image frames from the reference camera.

Example 22 includes the subject matter of Examples 17-21, further comprising selecting the temporally coherent disparity corresponding to the minimum temporally coherent disparity cost.

Example 23 includes the subject matter of Examples 17-22, further comprising determining the temporally coherent disparity based on applying one of a graph cut or a belief propagation to the temporally coherent disparity costs.

Example 24 includes the subject matter of Examples 17-23, further comprising estimating pixel depth based on the temporally coherent disparity.

Example 25 is a system for calculation of temporally coherent disparity. The system comprises: means for calculating a plurality of initial spatial disparity costs between a pixel of a first image frame from a reference camera and each of a plurality of corresponding pixels in an image frame from a secondary camera; means for estimating a motion vector for the pixel of the first image frame from the reference camera to a corresponding pixel from a second image frame from the reference camera; means for calculating a confidence value associated with the estimated motion vector, the confidence value based on a measure of similarity between the color of the pixel of the first image frame and the color of the pixel of the second image frame, from the reference camera; means for calculating temporally coherent disparity costs based on the initial spatial disparity costs weighted by the confidence value; and means for selecting a temporally coherent disparity based on the temporally coherent disparity costs.

Example 26 includes the subject matter of Example 25, further comprising means for calculating the initial spatial disparity costs based on a sum of absolute differences of one or more features of the pixel of the first image frame from the reference camera and the corresponding pixels from the image frame from the secondary camera.

Example 27 includes the subject matter of Examples 25 and 26, wherein the one or more features include a red-green-blue (RGB) value, a grayscale value or a census value.

Example 28 includes the subject matter of Examples 25-27, further comprising means for estimating the motion vector based on one of block matching or optical flow processing.

Example 29 includes the subject matter of Examples 25-28, further comprising means for estimating the motion vector based on locations of the corresponding pixel in additional image frames from the reference camera.

Example 30 includes the subject matter of Examples 25-29, further comprising means for selecting the temporally coherent disparity corresponding to the minimum temporally coherent disparity cost.

Example 31 includes the subject matter of Examples 25-30, further comprising means for determining the temporally coherent disparity based on applying one of a graph cut or a belief propagation to the temporally coherent disparity costs.

Example 32 includes the subject matter of Examples 25-31, further comprising means for estimating pixel depth based on the temporally coherent disparity.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for calculation of temporally coherent disparity, the method comprising:
   calculating, by one or more processors, a plurality of initial spatial disparity costs between a pixel of a first image frame from a reference camera and each of a plurality of corresponding pixels in an image frame from a secondary camera;
   estimating, by the one or more processors, a motion vector for the pixel of the first image frame from the reference camera to a corresponding pixel from a second image frame from the reference camera;
   calculating, by the one or more processors, a confidence value associated with the estimated motion vector, the confidence value based on a measure of similarity between the color of the pixel of the first image frame and the color of the pixel of the second image frame, from the reference camera;
   calculating, by the one or more processors, temporally coherent disparity costs based on the initial spatial disparity costs weighted by the confidence value; and
   selecting, by the one or more processors, a temporally coherent disparity based on the temporally coherent disparity costs.

2. The method of claim 1, further comprising calculating the initial spatial disparity costs based on a sum of absolute differences of one or more features of the pixel of the first image frame from the reference camera and the corresponding pixels from the image frame from the secondary camera.

3. The method of claim 2, wherein the one or more features include a red-green-blue (RGB) value, a grayscale value or a census value.

4. The method of claim 1, further comprising estimating the motion vector based on one of block matching or optical flow processing.

5. The method of claim 1, further comprising estimating the motion vector based on locations of the corresponding pixel in additional image frames from the reference camera.

6. The method of claim 1, further comprising selecting the temporally coherent disparity corresponding to the minimum temporally coherent disparity cost.

7. The method of claim 1, further comprising determining the temporally coherent disparity based on applying one of a graph cut or a belief propagation to the temporally coherent disparity costs.

8. The method of claim 1, further comprising estimating pixel depth based on the temporally coherent disparity.

9. A system for calculation of temporally coherent disparity, the system comprising:
   a disparity cost initialization circuit configured to calculate a plurality of initial spatial disparity costs between a pixel of a first image frame from a reference camera and each of a plurality of corresponding pixels in an image frame from a secondary camera;
   a motion estimation circuit configured to estimate a motion vector for the pixel of the first image frame from the reference camera to a corresponding pixel from a second image frame from the reference camera;
   a confidence calculation circuit configured to calculate a confidence value associated with the estimated motion vector, the confidence value based on a measure of similarity between the color of the pixel of the first image frame and the color of the pixel of the second image frame, from the reference camera;
   a disparity cost calculation circuit configured to calculate temporally coherent disparity costs based on the initial spatial disparity costs weighted by the confidence value; and
   a disparity calculation circuit configured to select a temporally coherent disparity based on the temporally coherent disparity costs.

10. The system of claim 9, wherein the disparity cost initialization circuit is further configured to calculate the initial spatial disparity costs based on a sum of absolute differences of one or more features of the pixel of the first image frame from the reference camera and the corresponding pixels from the image frame from the secondary camera.

11. The system of claim 9, wherein the disparity calculation circuit is further configured to determine the temporally coherent disparity based on applying one of a graph cut or a belief propagation to the temporally coherent disparity costs.

12. The system of claim 9, further comprising a depth estimation circuit configured to estimate pixel depth based on the temporally coherent disparity.

13. At least one non-transitory computer readable storage medium having instructions encoded thereon that, when executed by one or more processors, result in the following operations for calculation of temporally coherent disparity, the operations comprising:
   calculating a plurality of initial spatial disparity costs between a pixel of a first image frame from a reference camera and each of a plurality of corresponding pixels in an image frame from a secondary camera;
   estimating a motion vector for the pixel of the first image frame from the reference camera to a corresponding pixel from a second image frame from the reference camera;
   calculating a confidence value associated with the estimated motion vector, the confidence value based on a measure of similarity between the color of the pixel of the first image frame and the color of the pixel of the second image frame, from the reference camera;
   calculating temporally coherent disparity costs based on the initial spatial disparity costs weighted by the confidence value; and
   selecting a temporally coherent disparity based on the temporally coherent disparity costs.

14. The computer readable storage medium of claim 13, further comprising calculating the initial spatial disparity costs based on a sum of absolute differences of one or more features of the pixel of the first image frame from the reference camera and the corresponding pixels from the image frame from the secondary camera.

15. The computer readable storage medium of claim 14, wherein the one or more features include a red-green-blue (RGB) value, a grayscale value or a census value.

16. The computer readable storage medium of claim 13, further comprising estimating the motion vector based on one of block matching or optical flow processing.

17. The computer readable storage medium of claim 13, further comprising estimating the motion vector based on locations of the corresponding pixel in additional image frames from the reference camera.

18. The computer readable storage medium of claim 13, further comprising selecting the temporally coherent disparity corresponding to the minimum temporally coherent disparity cost.

19. The computer readable storage medium of claim 13, further comprising determining the temporally coherent disparity based on applying one of a graph cut or a belief propagation to the temporally coherent disparity costs.

20. The computer readable storage medium of claim 13, further comprising estimating pixel depth based on the temporally coherent disparity.

21. The method of claim 1, wherein the confidence value is based on a sum of differences between RGB values in a window around the pixel of the first image frame and RGB values in a window around the corresponding pixel from the second image frame.

22. The system of claim 9, wherein the confidence value is based on a sum of differences between RGB values in a window around the pixel of the first image frame and RGB values in a window around the corresponding pixel from the second image frame.

23. The computer readable storage medium of claim 13, wherein the confidence value is based on a sum of differences between RGB values in a window around the pixel of the first image frame and RGB values in a window around the corresponding pixel from the second image frame.

* * * * *